July 19, 1966     H. A. NIBECKER     3,261,458
CONTAINER
Original Filed April 23, 1964
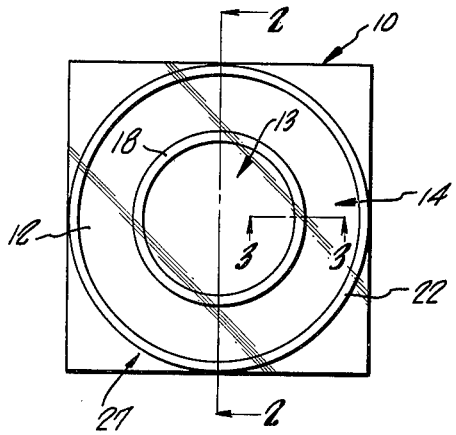
FIG_1_
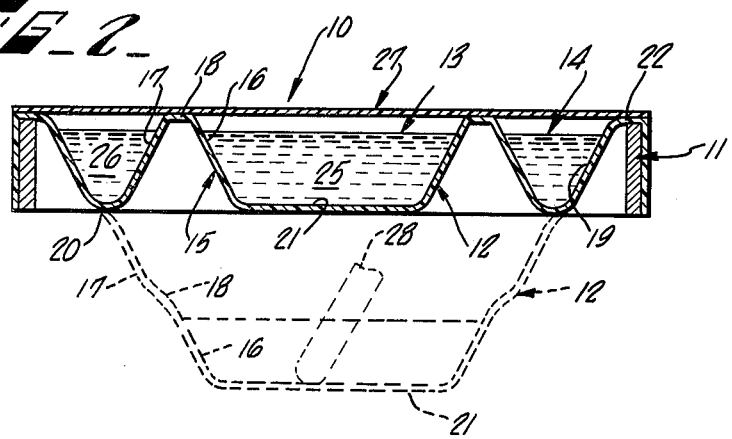
FIG_2_
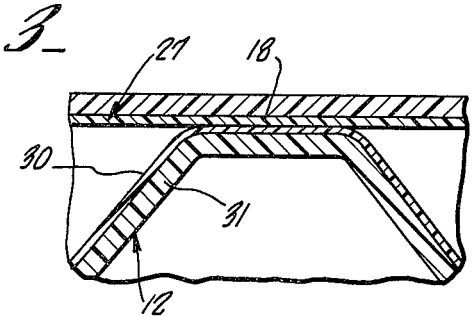
FIG_3_
INVENTOR.
HOWARD A. NIBECKER
BY
Christie, Parker & Hale
ATTORNEYS.

3,261,458
CONTAINER

Howard A. Nibecker, Laguna Beach, Calif., assignor to Laguna Scientific Industries, Santa Ana, Calif., a corporation of California
Continuation of application Ser. No. 362,110, Apr. 23, 1964. This application Feb. 19, 1965, Ser. No. 437,627
4 Claims. (Cl. 206—47)

This application is a continuation of my copending application Serial No. 362,110 filed April 23, 1964, now abandoned and entitled, "Multicompartment Container and Process for Making Same."

This invention relates to a container fabricated from a moldable laminated plastic material having the property of being substantially impervious to gases.

The container of this invention can be manufactured in many different forms. However, it is especially useful when fabricated as a multicompartment container as described in U.S. Patent No. 3,145,838, E. L. Van Deusen, issued August 25, 1964, and entitled, "Departmentalized Package," and the invention will be described with reference to such a container.

Many different types of containers have been fabricated from various plastic materials. Plastic containers are especially advantageous for many applications because they combine the qualities of low cost and weight with high strength, safety and handling ease. However, while conventional plastic containers have been sufficiently leak-free to retain many materials without liquid leakage, they have not been satisfactory in certain packaging applications which require a vapor-impervious container.

Many materials to be packaged have a high vapor pressure, and it has been found that the vapors from such volatile materials can diffuse rather readily through the walls of a conventional plastic container. This diffusion or vapor leakage can affect both quantity and quality of the packaged material, and may release noxious or dangerous fumes. Furthermore, oxygen and other gases in the atmosphere surrounding the container may migrate inwardly through the container walls, contaminating or reacting with the packaged material.

This problem is particularly acute in the packaging of multicomponent products which require isolation of the several components during storage. For example, the marketing of small quantities of adhesives such as epoxy-resin cements is best accomplished in a single package provided with several compartments to separate and contain metered amounts of the epoxy resin and a hardener or catalyst. The several components of the cement are maintained in isolation from each other until just before use.

Polyethylene multicompartment containers as described in U.S. Patent No. 3,145,838 have been satisfactory for packaging many types of epoxy resins. However, these containers are not impervious to many vapors, and shelf life of some epoxy-resin components has been reduced by migration of water vapor and other gases from the outside atmosphere through the walls of the polyethylene container. Further reduction in shelf life arises from migration through the container walls of vapors of the volatile amines and amides sometimes used in the hardener or catalyst.

The container of this invention overcomes these disadvantages by providing a vapor-impervious structure which also incorporates the desirable characteristics of conventional plastic containers. The container can be readily fabricated into a variety of shapes, and is especially suitable for multicompartment packages holding several materials which must be isolated from each other and from the environment outside the package.

I have discovered that a vapor-impervious container can be constructed of a laminate of two plastic materials. One material acts as a barrier to the passage of gases, and a second compatible material provides the desired qualities of moldability and form retention, these qualities being important in a container such as described in U.S. Patent No. 3,145,838. Such a laminate can be thermoformed in a conventional vacuum-molding machine to the desired container shape.

I have determined that polyvinylfluoride sheet material has the desired vapor-barrier characteristic, but that this material is very difficult to mold and lacks the desired form-retention quality. However, I have further determined that a polyvinylfluoride sheet can be laminated with a second sheet of another material such as polyethylene, and that this composite material can be readily molded into a container which is substantially impervious to gases and is capable of retaining its molded shape.

These and other aspects of the invention will be more fully understood from the following detailed description taken in conjunction with the drawings in which:

FIG. 1 is a plan view of a multicompartment container such as described in U.S. Patent No. 3,145,838, constructed according to my invention;

FIG. 2 is an enlarged cross-sectional view taken along line 2—2 of FIG. 1;

FIG. 3 is an enlarged fragmentary cross-sectional view taken along line 3—3 of FIG. 1.

Referring to FIGS. 1 and 2, a multicompartment container 10 preferably includes an annular support ring 11 formed from heavy cardboard or the like. A deformable membrane 12 is secured to the outer surface of the support ring. The membrane is corrugated interiorly of the ring to define a circular central compartment 13 and a surrounding annular compartment 14. The compartments are separated from each other by a corrugation 15 which defines an outer wall 16 of the central compartment and an inner wall 17 of the annular compartment. The central compartment has a floor 21 across the lower edge of wall 16.

Walls 16 and 17 taper upwardly toward each other to a first planar land surface 18 which has a finite width. A second corrugation of the membrane defines an outer circumferential wall 19 of annular compartment 14. Walls 17 and 19 are connected together by an upwardly open, smoothly curved bend portion 20. An extension of the upper end of wall 19 passes over the upper rim of the support ring, defining a second land surface 22 which is substantially coplanar with first land surface 18.

As an example of the use of this type of container, the central compartment 13 is filled with a premeasured quantity of a first material 25 such as the first component of a two-part epoxy-resin system. The annular compartment 14 is filled with a premeasured quantity of a second material 26 such as the second component of the epoxy-resin system, as for example an amine or amide curing agent. A flexible cover membrane 27 (shown as transparent) is then disposed across and secured (as by heat sealing) to membrane 12 at land surfaces 18 and 22 so that each compartment of the container is isolated from the other and from the atmosphere.

When the contents of the container are to be mixed together to form, for example, an epoxy-resin adhesive, the cover membrance 27 is stripped off, and floor 21 is depressed by a stirring implement, such as a wooden stirring stick 28, to cause corrugation 15 to become distended from the position of the membrane shown in solid lines in FIG. 2 to the position shown in dashed lines. Walls 16 and 17 and land surface 18 thus merge together to cause compartments 13 and 14 to merge with one another. Materials 25 and 26 are then stirred together to provide the exact mixture desired. There is no transferring of materials from container to container, and all of material 25 is mixed with all of material 26.

According to this invention, membrane 12 and cover 27 are fabricated from a lamination as shown in FIG. 3 of a first sheet or lamina 30 of a material such as polyvinylfluoride. This material is chemically inert to most solvents and highly resistant to most amine or amide curing agents used in an epoxy-resin system. Moreover, polyvinylfluoride is substantially impervious to most gases. Hence, vapors from the materials 25 and 26 are confined within their respective compartments, and water vapor and other gases from the outside atmosphere are prevented from migrating inwardly through the walls of the container to deteriorate or otherwise affect the packaged materials.

The lamina 30 is carried by a sheet or lamina 31 of a material such as polypropylene or polyethylene which is flexible and readily moldable into the corrugated configuration shown in FIG. 2. Lamina 30 is coextensive with the lamina 31 and the laminae are bonded together by a suitable adhesive. Suitable lamination methods are well known to those skilled in the art of fabricating plastic materials.

The ratio of the thickness of lamina 31 to lamina 30 should be at least 2:1 and this ratio may be increased to at least 15:1 or more. In a presently preferred embodiment of the invention, the polyvinylfluoride is one thousandth of an inch thick, while lamina 31 consists of a sheet of polyethylene having a thickness of four to eight thousandths of an inch. A laminated membrane 12 having these characteristics is strong and yet adequately flexible as the polyvinylfluoride is not present to such an extent as to restrict the flexibility of the membrane. The polyvinylfluoride, however, is present to a thickness sufficient to ensure that a chemical and gas barrier is provided around the components of the epoxy-resin system contained in package 10.

I have found that this polyvinylfluoride-polyethylene laminate is suitable for use with conventional vacuum-forming machines. The laminate is heated until thermoformable, and subjected to sufficient vacuum to force it into initimate contact with the mold. The laminate should be allowed to cool before being removed from the mold.

Although the container of this invention has been described with reference to the multicompartment package disclosed in U.S. Patent 3,145,838, it will be apparent that it can be fabricated in many other forms. The invention has utility in any packaging application which requires a gas-impervious container possessing the other desirable attributes of conventional plastic containers.

I claim:
1. An article of manufacture comprising
   (a) a flexible laminate membrane consisting of a first lamina of flexible plastic material having the properties of form retention and moldability and a second lamina of flexible polyvinylfluoride,
   (b) the laminate being molded to form a central first receptacle and an annular second receptacle separated from the central receptacle by a first annular intervening wall and bounded on the outside circumference by a second annular outer wall,
   (c) a body of first material in the first receptacle,
   (d) a body of a second and different material in the second receptacle, the membrane being deformable by depression of the first receptacle to distend the first annular wall so as to merge the first and second receptacles and enable the first and second materials to be mixed, and
   (e) at least one of the materials including a component selected from the class consisting of amines and amides, the vapors of which are able to penetrate the first but not the second of the lamina.
2. An article of manufacture in accordance with claim 1 wherein the first lamina is polyethylene.
3. An article of manufacture in accordance with claim 1 in which the first lamina is at least twice as thick as the second lamina.
4. An article of manufacture comprising
   (a) a flexible laminate membrane consisting of a first lamina of flexible plastic material having the properties of form retention and moldability and a second lamina of flexible polyvinylfluoride,
   (b) the laminate being molded to form a central first receptacle and an annular second receptacle separated from the central receptacle by a first annular intervening wall and bounded on the outside circumference by a second annular outer wall,
   (c) a body of first material in the first receptacle,
   (d) a body of a second and different material in the second receptacle, the membrane being deformable by depression of the first receptacle to distend the first annular wall so as to merge the first and second receptacles and enable the first and second materials to be mixed,
   (e) at least one of the materials including a component selected from the class consisting of amines and amides, the vapors of which are able to penetrate the first but not the second of the lamina, and
   (f) a cover disposed across and sealing the center and outer compartments, the cover comprising a sheet of polyvinylfluoride.

References Cited by the Examiner

UNITED STATES PATENTS

| | | | |
|---|---|---|---|
| 2,781,551 | 2/1957 | Richerod | 150—0.5 |
| 2,899,110 | 8/1959 | Parker. | |

FOREIGN PATENTS

| | | |
|---|---|---|
| 805,388 | 12/1958 | Great Britain. |
| 959,971 | 6/1964 | Great Britain. |

LOUIS G. MANCENE, *Primary Examiner.*

THERON E. CONDON, *Examiner.*

J. M. CASKIE, *Assistant Examiner.*